Patented Feb. 13, 1951

2,541,646

UNITED STATES PATENT OFFICE 2,541,646

DICARBAMATES AND POLYMERS

Clyde E. Gleim, Akron, Ohio, assignor to Wingfoot Corporation, Akron, Ohio, a corporation of Delaware No Drawing. Application April 1, 1946, Serial No. 658,875

10 Claims. (Cl. 260—77.5)

This invention relates to a new class of dicarbamates and to the polymers thereof.

It has been discovered that the dicarbamates of this invention may be readily polymerized to hard, infusible, thermosetting and generally crystal-clear polymeric masses. The dicarbamates possessing this desirable property of polymerizability are the imidodicarboxylic acid diesters of an alcohol having a double bond adjacent to the second carbon atom from the hydroxyl group. These esters have the general formula

ROOCNHCOOR in which R is an unsaturated alcohol residue having a double bond adjacent to the second carbon atom from the carbonyl group connected through oxygen.

It might be presumed that carbamates of this type could be very simply made by reacting the chloroformic acid ester of an unsaturated alcohol with a carbamic acid ester of the same type of alcohol at temperatures above room temperature. However, when such a reaction is tried, using temperatures between about 25° C.–110° C., the desired carbamate is not produced. It has been discovered that these imidodicarboxylates may be prepared, nevertheless, by reacting the N-sodium derivative of the carbamic acid ester of an alcohol having a double bond adjacent to the second carbon atom from the hydroxyl group with the halo formate resulting from the reaction of carbonyl chloride with an alcohol having a double bond adjacent to the second carbon atom from the hydroxyl group. The reaction may be represented by general formula as follows, in which substantially equal molecular proportions of starting materials are used:

MNHCOOR+XCOOR→ROOCNHCOOR+MX in which M is any alkali metal, X is a halogen, such as chlorine, bromine or iodine and R is as defined above. The N-metal derivative of the carbamic acid mono ester having the formula $MNHCO_2R$ is prepared by reacting the carbamic acid ester ($H_2NCO_2R$) of the desired unsaturated alcohol with an alkali metal as, for example, metallic sodium, in the presence of an inert solvent such as liquid ammonia, benzene, ethyl ether and xylene, or kerosene and other similar inert hydrocarbons may be used. It is preferred to work with the N-sodium derivative of the carbamate and this derivative may be easily made by dissolving the carbamate as, for example, allyl carbamate, in liquid ammonia and then adding small pieces of metallic sodium or sodamide to the solution while stirring.

Carbamates having the general formula $H_2NCO_2R$ may be prepared by reacting a carbamyl halide, such as carbamyl chloride, with an unsaturated alcohol having a double bond adjacent to the second carbon atom from the hydroxyl group at a temperature between about 0° C.–100° C.

After the N-metal derivative of the carbamate, prepared in accordance with the above-preferred method, is freed of ammonia, the derivative is then reacted with the desired halo formate by slowly adding the formate to the reaction mixture during stirring at a temperature of between about —5° C. and about 25° C.

The halo formate having the formula XCOOR is prepared by reacting a haloformyl halide, such as phosgene [chlorformyl chloride ($COCl_2$)] with an alcohol having a double bond adjacent to the second carbon atom from the hydroxyl group at a temperature between about 0° C. and 100° C. in substantially equal molecular proportions. The reaction between the haloformyl halide and the carbamate proceeds smoothly and may be controlled by adjusting the temperature during the reaction. After the reaction is complete, the resulting mixture is poured into a dilute mineral acid, as, for example, cold dilute hydrochloric acid, and extracted with benzene or any other suitable solvent. The benzene layer is then washed with a suitable neutralizing agent, such as dilute sodium bicarbonate solution, followed by washing with water and then drying over any suitable drying agent, e. g., anhydrous potassium carbonate. The benzene or other solvent is removed by distillation and the residual liquid distilled through a distillation column to purify the imidodicarboxylate having the formula

ROOCNHCOOR in which R may be an alcohol residue of the unsaturated alcohols described immediately below. R may be the same or different.

The alcohols having a double bond adjacent to the second carbon atom from the hydroxyl group are those which have the atomic grouping HOC.C:C and those having the atomic grouping HOC:C.

Alcohols having the grouping HOC.C:C include allyl alcohol ($HOCH_2CH:CH_2$), and substituted allyl alcohols, such as 3-chloro-allyl alcohol, coniferyl alcohol [3-(4-hydroxy-3-methoxyphenyl)-allyl alcohol], 2-methyl-allyl alcohol, 1- phenyl-allyl alcohol (alpha-vinyl benzyl alcohol), 3-phenyl-allyl alcohol (cinnamyl alcohol), 1-(p-methoxyphenyl)-3-phenyl-allyl alcohol, 1,1,3-triphenyl-allyl alcohol, 3,3-dichloro-2-methyl-allyl alcohol, 1,1,3,3-tetrakis(p-methoxyphenyl)-allyl alcohol, 2-buten-1-ol, 4-methyl-3-penten-2-ol, 1-hexen-3-ol, 2-methyl-3-hexen-2-ol, 2-hexen-1-ol, 4-hexen-3-ol, 2-methyl-3-octen-2-ol.

Alcohols having the grouping HOC:C include 1-phenyl-ethenol (α-methylene-benzyl alcohol), 2,2-dimesityl-ethenol, triphenyl-ethenol, 2,2-bis-(2,3,4,6-tetramethyl phenyl)-ethenol, 1,2-dimesityl ethenol, 2,2-dimesityl-ethenol, 1,2-dimesityl-2-phenyl-ethenol, 2-mesityl-2-phenyl-ethenol, 2-phenyl-2-(2,3,4,6-tetramethylphenyl)-ethenol, 1-propen-1-ol, 1,2-diphenyl-1-propen-1-ol.

These carbamates having the general formula $H_2NCO_2R$ may also be prepared by first reacting phosgene [chloroformyl chloride ($COCl_2$)] with an unsaturated alcohol (above described), generally at room temperature without the aid of a catalyst but, where the reaction appears to be sluggish, heat may be employed to speed up the chemical union and cause the formation of the desired formyl halides. The resulting formyl halide is then reacted with ammonia to form the desired carbamate. The reaction will generally go to completion at room temperature without the aid of a catalyst.

Another method that may be used in forming these carbamates of general formula $H_2NCO_2R$ comprises the reaction of urea with an unsaturated alcohol (above described) under conditions effecting the elimination of ammonia and the formation of the desired ester.

The vinyl carbamates having the nucleus $H_2NCO_2C:CH_2$ may be made by reacting a vinyl chloroformate having the formula

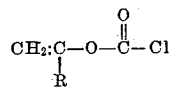

in which R may be hydrogen or any monovalent organic radical other than hydrogen, with ammonia. The vinyl chloroformates may be produced by pyrolysis of ethylene glycol bis (chloroformate) at a temperature sufficient to cause the elimination of $CO_2$ and HCl, generally 400 to 600° C. Details of the procedure are disclosed in U. S. 2,377,085.

These imidodicarboxylates have the unique characteristic of being polymerized by any suitable means to a hard, infusible, thermosetting polymeric mass, in most cases being crystal-clear, depending upon the purity of the starting materials. Temperatures between about room and up to the decomposition temperature of the composition may be used in carrying out the polymerization. When polymerization is slow, a catalyst may be used, such as any peroxide or oxygen-generating catalyst, i. e., benzoyl peroxide or tertiary butyl peroxide. Temperatures between about 60 and 85° C. are preferred when a polymerization catalyst is used.

The following examples illustrate specific embodiments of the invention and are intended to be illustrative only and not as limitations on the scope of the invention. The term "parts" wherever hereinafter used signifies "parts by weight."

EXAMPLE 1

*Diallyl imidodicarboxylate*

Twenty-three parts of sodium was dissolved in 400 parts of liquid ammonia (15 minutes) and then 110 parts of allyl carbamate was added slowly over a two-hour period. Stirring was continued until a colorless water-white reaction mixture was obtained. The ammonia was allowed to escape and the dry sodium salt was treated with 250 parts of benzene and 145 parts of dimethyl aniline. The addition of 120 parts of allyl chloroformate to the reaction mixture containing the sodium salt at about −5° C. gave the reaction product. After washing with cold water to remove soluble by-products, and with dilute hydrochloric acid to remove dimethyl aniline as the hydrochloride, the product was washed with dilute sodium bicarbonate to neutralize any acidic material and then was dried over anhydrous potassium carbonate. The diallyl imidodicarboxylate was recovered in a pure form by distillation, B. P. 145–147° C. at 3 mm., $n_D^{23}$ 1.4728, $d_{15}^{25}$ 1.160. Percent nitrogen found was 7.44 to 7.74%. Allyl imidodicarboxylate is reasonably stable at room temperature and is soluble in the common organic solvents.

EXAMPLE 2

*Diallyl imidodicarboxylate*

Three hundred parts of allyl carbamate was added to 600 parts of chloroformyl chloride ($COCl_2$) at about −10° C. with stirring over a five-hour period. Excess phosgene and hydrogen chloride by-product was removed from the N-carballyloxy carbamyl chloride

by bubbling dry nitrogen through the mixture at room temperature. The liquid was filtered from the solid by-products to give 320 parts of N-carballyloxy carbamyl chloride, $d_{15}^{23}$ 1.205.

Addition of 160 parts of N-carballyloxy carbamyl chloride to a mixture of 60 parts of allyl alcohol and 160 parts of pyridine at about −5° C. gave diallyl imidodicarboxylate which was recovered by washing the reaction mixture with cold dilute hydrochloric acid, dilute sodium bicarbonate solution and distilling the dried oil.

EXAMPLE 3

*Allyl methallyl imidodicarboxylate*

One hundred sixty parts of $C_3H_5OCONHCOCl$, prepared as described in Example 2, was added to a mixture of 75 parts of methallyl alcohol [$CH_2=C(CH_3)CH_2OH$] and 160 parts of pyridine at about −5° C. to give allyl methallyl imidodicarboxylate

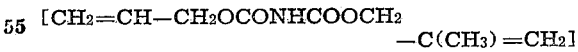

which was recovered by the method described in Example 2 for diallyl imidodicarboxylate.

EXAMPLE 4

*Vinyl allyl imidodicarboxylate*

Two hundred parts of vinyl carbamate was added to 500 parts of chloroformyl chloride at about −5° C. with stirring over a four-hour period to give the $CH_2=CHOCONHCOCl$ reagent. The addition of 140 parts of

to a mixture of 60 parts of allyl alcohol and 160 parts of pyridine at about −5° C. gave vinyl methallyl imidodicarboxylate,

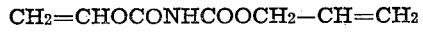

which was soluble in the common organic solvents.

EXAMPLE 5

*Diallyl imidodicarboxylate polymer*

Twenty-five parts of purified diallyl imidodicarboxylate was heated at 65° C. for 5 hours in the presence of 3% benzoyl peroxide to give a hard, clear, glass-like polymer which was insoluble in the common organic solvents, such as ketones, alcohols and ethers. The polymer (Rockwell M hardness=92) was also insoluble in weak acids and bases.

EXAMPLE 6

*Allyl methallyl imidodicarboxylate polymer*

Twenty parts of allyl methallyl imidodicarboxylate was heated at 65° C. for 15 hours with 2.5% benzoyl peroxide to give a hard, glass-like polymeric mass which was infusible, and insoluble in the common organic solvents and in weak acids and bases.

EXAMPLE 7

*Vinyl allyl imidodicarboxylate polymer*

Ten parts of vinyl allyl imidodicarboxylate was heated at 55° C. for 18 hours in the presence of 2.5% benzoyl peroxide to give a hard, polymeric mass which was infusible, and insoluble in the common organic solvents and in weak acids and bases.

EXAMPLE 8

*Diallyl imidodicarboxylate-allyl methylene carbamate copolymer*

Twenty parts of diallyl imidodicarboxylate was mixed with 80 parts of allyl methylene carbamate, [(ROCON=CH$_2$)$_x$, where $x$=1, or 2, or 3] and was heated for 36 hours at 55° C. in the presence of 2% benzoyl peroxide to give a hard, clear, glass-like copolymer. The copolymer was infusible, and insoluble in the common organic solvents and in dilute acids and bases. R is allyl.

EXAMPLE 9

*Diallyl imidodicarboxylate-diethylene glycol bis (allyl carbonate) copolymer*

Twenty parts of diallyl imidodicarboxylate was mixed with 80 parts of diethylene glycol bis(allyl carbonate) and was heated at 55° C. for 28 hours in the presence of 2% benzoyl peroxide to give a hard, clear, infusible and insoluble copolymer.

EXAMPLE 10

*Diallyl imidodicarboxylate-acrylonitrile copolymer*

Twenty parts of diallyl imidodicarboxylate was mixed with 80 parts of acrylonitrile and was heated with 0.5% benzoyl peroxide at 55° C. for three hours to give a hard polymeric mass which was insoluble in the common organic solvents.

EXAMPLE 11

*Diallyl imidodicarboxylate-vinyl acetate copolymer*

Twenty parts of diallyl imidodicarboxylate was mixed with 80 parts of vinyl acetate and was heated at 55° C. for 48 hours in the presence of 2% benzoyl peroxide to give a clear, polymeric mass which was insoluble in the common organic solvents.

EXAMPLE 12

*Diallyl imidodicarboxylate-styrene copolymer*

Twenty parts of diallyl imidodicarboxylate was mixed with 80 parts of freshly distilled styrene and was heated with 2% benzoyl peroxide for 48 hours at 55° C. to give a hard, glass-like, opaque polymeric mass.

EXAMPLE 13

*Diallyl imidodicarboxylate-methyl acrylate copolymer*

Twenty parts of diallyl imidodicarboxylate was mixed with 80 parts of methyl acrylate and was heated in the presence of 0.5% benzoyl peroxide at 50° C. for 4 hours to give a transparent polymeric mass.

The imidodicarboxylates of this invention may also be prepared by reacting the half ester of an imidodicarboxylic acid halide (ROCONHCOX), in which X is halogen and in which R is an alcohol residue having a double bond adjacent to the second carbon atom from the hydroxyl group, with an alcohol having a double bond adjacent the second carbon atom from the hydroxyl group at a temperature from between about −20° C. and about 100° C. in the presence of a base which will take up the liberated hydrogen halide as it is formed, as, for example, pyridine, dimethyl aniline, quinoline, etc. The half ester of an imidodicarboxylic acid halide is prepared by reacting a chloroformyl halide (COX$_2$) with a carbamic acid ester of an alcohol having a double bond adjacent the second carbon atom from the hydroxyl group at a temperature between about −20° C. and 100° C. in the presence of a base, above described, to take up the hydrogen halide as it is formed.

The esters of each of the foregoing examples are soluble in most of the organic solvents, including the alcohols, the ketones, the ethers, the aromatic hydrocarbons and the higher boiling aliphatic hydrocarbons. Specific solvents are ethyl alcohol, acetone, diethyl ether, benzene and kerosene. The monomers are insoluble in water.

The polymers are generally insoluble in all common organic solvents, including the alcohols, the ketones, the ethers, the aromatic hydrocarbons, weak acids and bases. Specific solvents which do not affect the polymers are 95% ethyl alcohol, methyl ethyl ketone, ethyl acetate, dibutyl ether, carbon tetrachloride, benzene, gasoline, 30% sulfuric acid, 10% sodium hydroxide, 10% hydrochloric acid, 10% nitric acid, etc.

The dicarbamates of this invention may also be copolymerized with other polymerizable unsaturated compounds as, for example, styrene, pinene, camphene, monovinyl acetylene, divinyl acetylene, vinyl ethynyl (CH$_2$=CH—C≡CH), vinyl acetate, vinyl chloride, the acrylates such as butyl acrylate, methyl methacrylate, methyl chloroacrylate, and furyl acrylate, acrylic amide, acrylic nitrile, etc. In fact, copolymerization may be effected with any of the known polymerizable organic monomeric compounds, especially those having a terminal methylene (CH$_2$) group and especially those in which the terminal methylene group is attached by an ethylenic double bond to a carbon which is in turn attached to a negative group, i. e., RCO—, RCCO—, NO$_2$—, C$_6$H$_5$—, C$_{10}$H$_7$—, RO—, NC—, RNHCO—, NH$_2$CO—, (RCO)$_2$N—, RCONH—, Cl—, CH$_2$:CH—, RCH:CH—, CH≡C—, NOOCCH:CH—, CH$_2$:CHO—, R being alkyl or aryl including vinyl or vinylidene, i. e., styrene, vinyl acetate, methyl methacrylate, unsymmetrical dichloroethylene, vinyl chloride, diallyl maleate, diallyl fumarate, diallyl chlormaleate, triallyl citrate, diallyl phthalate and diethylene bis(allyl carbonate).

Copolymerizable monoolifines may be reacted with the carbamates of this invention to form useful compositions and include such members as vinyl ketones and esters, e. g., methyl vinyl ether, propyl vinyl ether, methyl vinyl ketone, ethyl vinyl ketone, vinyl chloroacetate, vinyl propionate, vinyl carbazole; acrylic and methacrylic acids and their amides, nitriles and esters.

The copolymerization may generally be carried out under the conditions described with respect to the polymerization of the dicarbamates. At lower temperatures than those described, the copolymerization is usually too slow, while at higher temperatures more elaborate equipment is required to control the polymerization process.

Modified copolymers may be made by conducting the polymerization in the presence of any of the well-known modifying agents, such as fillers, dyes, plasticizers and pigments. The copolymer product may also be modified after being formed, the polymeric masses having a wide variety of uses, including formed structures, for example, as a low pressure laminate resin with glass cloth.

Suitable changes may be made in the details of the process without departing from the spirit or scope of the present invention, the proper limits of which are defined in the appended claims.

I claim:

1. The imidodiformic acid diester of a monohydric alcohol having an ethylenic double bond adjacent to the second carbon atom from the hydroxyl group and connecting two carbon atoms.

2. The imidodiformic acid diester of a monohydric alcohol having an ethylenic double bond between the first and second carbon atom from the hydroxyl group.

3. The imidodiformic acid diester of a monohydric alcohol having an ethylenic double bond between the second and third carbon atom from the hydroxyl group.

4. The imidodiformic acid diester of allyl alcohol.

5. A polymer of the imidodiformic acid diester of a monohydric alcohol having an ethylenic double bond adjacent to the second carbon atom from the hydroxyl group and connecting two carbon atoms.

6. A polymer of the imidodiformic acid diester of a monohydric alcohol having an ethylenic double bond between the first and second carbon atom from the hydroxyl group.

7. A polymer of the imidodiformic acid diester of a monohydric alcohol having an ethylenic double bond between the second and third carbon atom from the hydroxyl group.

8. A polymer of the imidodiformic acid diester of allyl alcohol.

9. The copolymer of 20 parts of the imidodiformic acid diester of a monohydric alcohol having an ethylenic double bond adjacent to the second carbon atom from the hydroxyl group and connecting two carbon atoms and 80 parts of another copolymerizable monomer.

10. The method of forming an imidodiformic acid diester of a monohydric alcohol having an ethylenic double bond adjacent to the second carbon atom from the hydroxyl group and connecting two carbon atoms which comprises reacting the half ester of an imidodicarboxylic acid halide of an alcohol having a double bond adjacent the second carbon atom from the hydroxyl group with an alcohol having a double bond adjacent the second carbon atom from the hydroxyl group until the reaction is substantially complete.

CLYDE E. GLEIM.

REFERENCES CITED

The following references are of record in the file of this patent:

UNITED STATES PATENTS

| Number | Name | Date |
|---|---|---|
| 2,390,551 | Muskat et al. | Dec. 11, 1945 |
| 2,394,592 | Chenicek | Feb. 12, 1946 |
| 2,401,549 | Chenieck | June 4, 1946 |

OTHER REFERENCES

Beilstein, vols. 3, pages 27 and 28.

Certificate of Correction

Patent No. 2,541,646　　　　　　　　　　　　　　　　　　February 13, 1951

CLYDE E. GLEIM

It is hereby certified that error appears in the printed specification of the above numbered patent requiring correction as follows:

Column 6, line 74, after the syllable "dene" and before the comma insert *derivatives*;

and that the said Letters Patent should be read as corrected above, so that the same may conform to the record of the case in the Patent Office.

Signed and sealed this 10th day of April, A. D. 1951.

[SEAL]

THOMAS F. MURPHY,
　　　　　　　　　　　　　　　　　　　*Assistant Commissioner of Patents.*